US012141893B2

(12) United States Patent
Soffair et al.

(10) Patent No.: US 12,141,893 B2
(45) Date of Patent: Nov. 12, 2024

(54) CACHE ARCHITECTURE FOR IMAGE WARP PROCESSING SYSTEMS AND METHODS

(71) Applicant: Apple Inc., Cupertino, CA (US)

(72) Inventors: Ido Y Soffair, Tel-Aviv (IL); Uri Nix, Haifa (IL); Yung-Chin Chen, Saratoga, CA (US); Jim C Chou, San Jose, CA (US); Jian Zhou, Pleasanton, CA (US); Assaf Menachem, Hod Hasharon (IL); Sorin C Cismas, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 130 days.

(21) Appl. No.: 17/933,409

(22) Filed: Sep. 19, 2022

(65) Prior Publication Data

US 2024/0095871 A1 Mar. 21, 2024

(51) Int. Cl.
*G06T 1/20* (2006.01)
*G06T 1/60* (2006.01)

(52) U.S. Cl.
CPC . *G06T 1/60* (2013.01); *G06T 1/20* (2013.01)

(58) Field of Classification Search
CPC .......... G06T 1/20; G06T 1/60; G06T 3/0006; G06T 3/0093; G06T 2207/20036; G06T 2210/44
USPC ........................................ 345/557, 646, 647
See application file for complete search history.

(56) References Cited

U.S. PATENT DOCUMENTS

2003/0188125 A1* 10/2003 Segelken .............. G06F 9/3555
711/219
2015/0262344 A1* 9/2015 Stec ........................... G06T 5/80
382/275
2018/0315164 A1 11/2018 Shin
2018/0315170 A1* 11/2018 Mills .......................... G06T 3/18
2021/0182200 A1 6/2021 Liao et al.
2021/0264560 A1* 8/2021 Hong ........................ G06T 1/20
2021/0272232 A1 9/2021 Hong et al.
2022/0044349 A1 2/2022 Smirnov et al.
2022/0059054 A1 2/2022 Schluessler et al.
(Continued)

FOREIGN PATENT DOCUMENTS

WO 2019217260 A1 11/2019

OTHER PUBLICATIONS

International Search Report and Written Opinion for PCT Application No. PCT/US2023/032985 dated Jan. 5, 2024; 13 pgs.

*Primary Examiner* — Jacinta M Crawford
(74) *Attorney, Agent, or Firm* — Fletcher Yoder P.C.

(57) ABSTRACT

A device may include a display for displaying an image frame based on warped image data and image processing circuitry to generate the warped image data by warping input image data to account for one or more distortions associated with displaying the image. The image processing circuitry may include a two-stage cache architecture having an first cache and an second cache and warp the input image data by generating mapping data indicative of a warp between the input image space and the output image space and fetching the input image data to populate the first cache. Warping may also include populating the second cache with a grouping of pixel values from the first cache that are selected according to a sliding window that traverses the first cache based on the mapping data and interpolating between pixel values of the grouping to generate pixel values of the warped image data.

20 Claims, 12 Drawing Sheets

(56) References Cited

U.S. PATENT DOCUMENTS

2022/0147753 A1 5/2022 Fang
2022/0188970 A1 6/2022 Shicht et al.

* cited by examiner

CACHE ARCHITECTURE FOR IMAGE WARP PROCESSING SYSTEMS AND METHODS

BACKGROUND

The present disclosure relates generally to displayed image processing and, more particularly, to image warping and the cache architecture therefor.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual information such as text, still images, and/or video by displaying one or more images. For example, such electronic devices may include computers, mobile phones, portable media devices, tablets, televisions, virtual-reality headsets, and vehicle dashboards, among many others. To display an image, an electronic display may control light emission of its display pixels based at least in part on corresponding image data. Moreover, the image data may be processed to account for one or more physical or digital effects associated with displaying the image data. For example, image data may be compensated for pixel aging (e.g., burn-in compensation), cross-talk between electrodes within the electronic device, transitions from previously displayed image data (e.g., pixel drive compensation), warps, contrast control, and/or other factors that may cause distortions or artifacts perceivable to a viewer.

In particular, it may be desirable to change the amount or distribution of the pixel values to account for different display scenarios. For example, image data may be warped to account for environmental surroundings, display characteristics, a viewer's point-of-view (POV), and/or other factors that may distort the perceived image to a viewer. Thus, before being displayed, the image data may be processed to warp the image using the desired changes to the amount or distribution of pixel values such that the perceived image is not distorted. However, performing such warps efficiently and/or within bandwidth/timing limitations (e.g., for real-time operations) may be difficult.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Image processing circuitry may warp one or more sets of input image data to account for input distortions (e.g., camera lens distortion), output distortions (e.g., lensing effects associated with the shape of the display panel and/or glass cover thereof), processing distortions (e.g., a POV change, shifts, scaling, foveation related resolution changes, etc.) and/or to achieve a common image space for blending. For example, the image processing circuitry (e.g., a warp block) may utilize configuration data associated with the desired warp effects to generate a mapping from the input image data to the warped image data. The configuration data may include or define mappings, algorithms, and/or parameters indicative of the warp to be accomplished for a set of input image data. Furthermore, the configuration data may include static and/or dynamic aspects to account for warp characteristics that do not change (e.g., display geometry) and things that do (e.g., POV changes, shifts, scaling, foveation related resolution changes, etc.). In other words, which input pixels map to which output pixel positions on the display panel (e.g., as achieved by warping the input image data) may change based on parameters, algorithms, mappings, etc. that are captured in the configuration data.

Moreover, the image processing circuitry may fetch the input image data (e.g., from memory) and, utilizing the mapping, generate an output pixel value based on the input image data. Furthermore, in some embodiments, the output pixel value may be interpolated from a set of multiple input pixel values selected based on the mapping. However, performing such warps while maintaining synchronicity and/or within timing restraints of the system may prove difficult, particularly for real-time operations such as warping a camera feed. As such, the image processing circuitry may utilize a two-stage cache architecture to efficiently and/or within bandwidth/timing limitations fetch and interpolate the input image data to generate the warped image data.

In some embodiments, a first cache is filled with input image data by a fetcher. Moreover, the fetcher may utilize the mapping (e.g., based on the configuration data) to fetch the input image data in an order associated with the mapping. For example, instead of fetching the input image data in raster scan order, the input image data may be fetched in tiled sections along a virtual curve indicative of a raster scan of the warped image data mapped to the source image space. In other words, the fetcher may request input image data to a first cache in an intended order of use. Additionally, a second cache may be filled from the first cache according to a sliding window that follows the virtual curve in the source image space. Moreover, the sliding window may include pixel values surrounding the pixel location (in the source image space) that maps to the warped image data pixel location (in the output image space) to accommodate interpolations. Additionally, as the second cache includes multiple input pixel values, in some embodiments, multiple warped pixel values may be determined simultaneously (e.g., processed together from the second cache), which may increase efficiency and/or reduce processing time.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
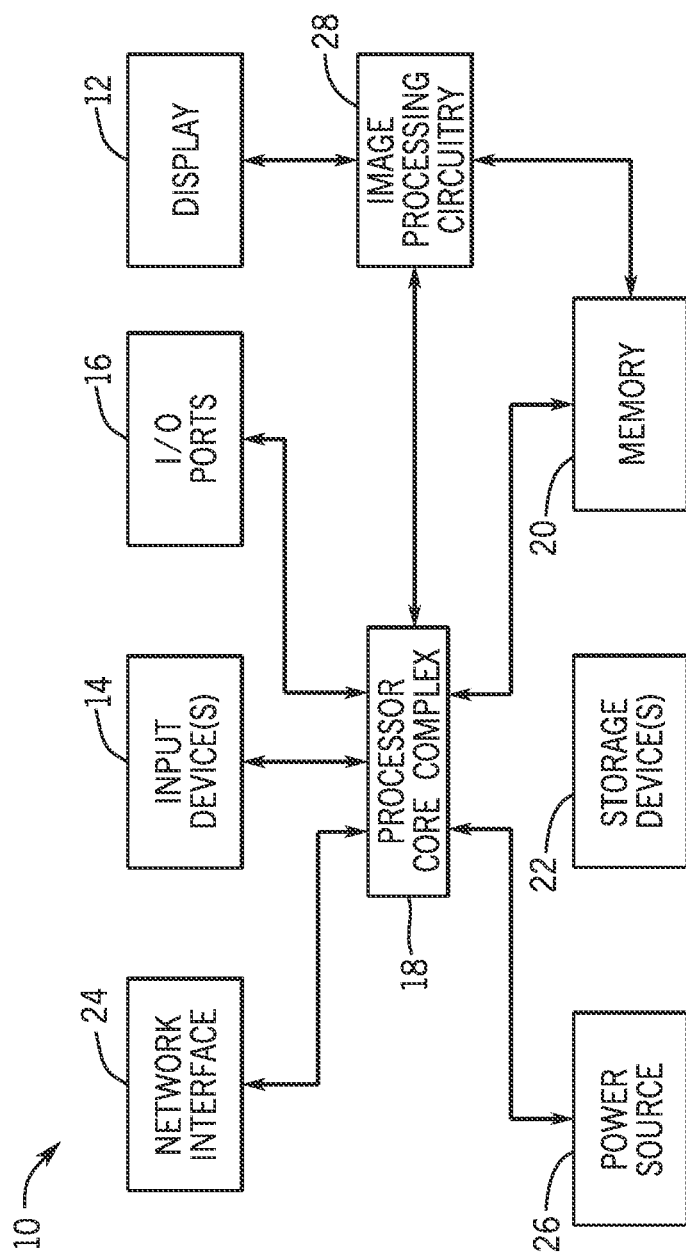
FIG. 1 is a schematic diagram of an electronic device that includes an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the luminance (and, as a consequence, the color) of its display pixels based on corresponding image data received at a particular resolution. For example, an image data source may provide image data as a stream of pixel data, in which data for each pixel indicates a target luminance (e.g., brightness and/or color) of one or more display pixels located at corresponding pixel positions. In some embodiments, image data may indicate luminance per color component, for example, via red component image data, blue component image data, and green component image data, collectively referred to as RGB image data (e.g., RGB, sRGB). Additionally or alternatively, image data may be indicated by a luma channel and one or more chrominance channels (e.g., YCbCr, YUV, etc.), grayscale (e.g., gray level), or other color basis. It should be appreciated that a luma channel, as disclosed herein, may encompass linear, non-linear, and/or gamma-corrected luminance values.

Additionally, the image data may be processed to account for one or more physical or digital effects associated with displaying the image data. For example, image data may be compensated for pixel aging (e.g., burn-in compensation), cross-talk between electrodes within the electronic device, transitions from previously displayed image data (e.g., pixel drive compensation), warps, contrast control, and/or other factors that may cause distortions or artifacts perceivable to a viewer. For example, in some scenarios, the image to be displayed may, if unaltered, appear distorted when perceived by a viewer due to environmental effects, properties of the display, the viewer's point-of-view (POV) perspective, image processing alterations such as shifts and scaling, and/or other distorting factors. For example, the display may include a screen with curved edges and/or lensing effects that may distort an image if displayed without correction. Furthermore, a viewer's POV relative to the display may alter how the viewer perceives the image. For example, a viewer's gaze may be determined based on the viewer's determined location relative to the display and/or eye-tracking. Furthermore, the display may be a foveated display such that different portions of the screen are displayed at different resolutions (e.g., depending on a viewer's gaze/focal point on the display). Additionally or alternatively, image data may be received from a distorted source such as a camera, and the image data may be warped to account for lensing effects associated with capturing the image. As such, it may be desirable to change the amount (e.g., resolution) or distribution such as (e.g., shape, relative size, perspective, etc.) of the pixel values to account for different display scenarios and/or input image characteristics. Thus, before being displayed, image data may be processed to warp the image using the desired changes to the amount or distribution of pixel values such that the perceived image is not distorted.

Furthermore, in some embodiments, an image to be displayed may be generated based on multiple sets of image data from one or more sources that are blended together. Image blending may utilized (e.g., for virtual reality, mixed reality, and/or augmented reality) to incorporate image data from multiple sources into a single image frame. For example, a generated object may be incorporated into an image capture (e.g., via a camera) of a real-life surrounding, a portion of a captured image may be incorporated into a virtual surrounding, and/or a combination of both. As such, the image data of multiple sources may be blended together to form a single output image. In some embodiments, each set of image data may be warped to a common image space prior to blending.

As discussed herein, image processing circuitry may warp one or more sets of input image data to account for input distortions (e.g., camera lens distortion), output distortions (e.g., lensing effects associated with the shape of the display panel and/or glass cover thereof), processing distortions (e.g., a POV change, shifts, scaling, etc.) and/or to achieve a common image space for blending. Moreover, the image processing circuitry may include separate warp hardware (e.g., for parallel processing) and/or perform separate warp operations using the same hardware for different sets of input image data.

In some embodiments, the image processing circuitry (e.g., a warp block) may utilize configuration data associated with the desired warp effects to generate a mapping from the input image data to the warped image data. The configuration data may include mappings, algorithms, and/or parameters indicative of the warp to be accomplished for a set of input image data. Furthermore, the configuration data may include static and/or dynamic aspects. For example, the configuration data may include a static mapping between a generated graphics image space to a display image space accounting for distortions associated with the electronic display that do not change. Moreover, the configuration data may include a static mapping between a camera image space to a display image space accounting for camera lens distortions that do not change and distortions associated with the electronic display that do not change. As should be appreciated, captured image data from a camera is given as an example set of input image data, and such data may or may not be processed or partially processed prior to the warp block of the image processing circuitry. Moreover, the camera may include multiple or variable lenses that correlate to a dynamic portion of the configuration data. Additionally, dynamic aspects may be included in the configuration data to provide for different mappings in different scenarios. For example, in a foveated display, the output resolution at different portions of the display panel may change depending on a focal point of the user's gaze, such as determined by eye tracking. In other words, which input pixels map to which output pixel positions on the display panel (e.g., as achieved by warping the input image data) may change based on additional input parameters that are captured in the configuration data.

Based on the configuration data, a mapping may be determined correlating the output pixel values of warped image data to pixel values of the input image data. As should be appreciated, the output image space may be associated with the physical pixel locations of the display panel (e.g., the display image space) or any desired image space. Moreover, the image processing circuitry may fetch the input image data (e.g., from memory) and, utilizing the mapping, generate an output pixel value based on the input image data. Furthermore, in some embodiments, the output pixel value may be interpolated from a set of multiple input pixel values selected based on the mapping. However, performing such warps while maintaining synchronicity and/or within timing restraints of the system may prove difficult, particularly for real-time operations such as warping a camera feed. As such, the image processing circuitry may utilize a two-stage cache architecture to efficiently and/or within bandwidth/timing limitations fetch and interpolate the input image data to generate the warped image data.

In some embodiments, a first cache is filled with input image data by a fetcher. Moreover, the fetcher may utilize the mapping (e.g., based on the configuration data) to fetch the input image data in an order associated with the mapping. For example, instead of fetching the input image data in raster scan order, the input image data may be fetched in tiled sections along a virtual curve indicative of a raster scan of the warped image data mapped to the source image space. In other words, the fetcher may request input image data to the first cache in an intended order of use. Additionally, the second cache may be filled from the first cache according to a sliding window that follows the virtual curve in the source image space. Moreover, the sliding window may include pixel values surrounding the pixel location (in the source image space) that maps to the warped image data pixel location (in the output image space) to accommodate interpolations. Additionally, as the second cache includes multiple input pixel values, in some embodiments, multiple warped pixel values may be determined simultaneously (e.g., processed together from the second cache), which may increase efficiency and/or reduce processing time.

With the foregoing in mind, FIG. 1 is an example electronic device 10 with an electronic display 12 having independently controlled color component illuminators (e.g., projectors, backlights, etc.). As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry 28 (e.g., a graphics processing unit, a display image processing pipeline, etc.) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) (e.g., of an operating system or computer program), an application interface, text, a still image, and/or video content. The electronic display 12 may include a display panel with one or more display pixels to facilitate displaying images. Additionally, each display pixel may represent one of the sub-pixels that control the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance output (e.g., light emission) of the sub-pixels based on corresponding image data. In some embodiments, pixel or image data may be generated by an image source, such as the processor core complex 18, a graphics processing unit (GPU), or an image sensor (e.g., camera). Additionally, in some embodiments, image data may be received from another electronic device 10, for example, via the network interface 24 and/or an I/O port 16. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
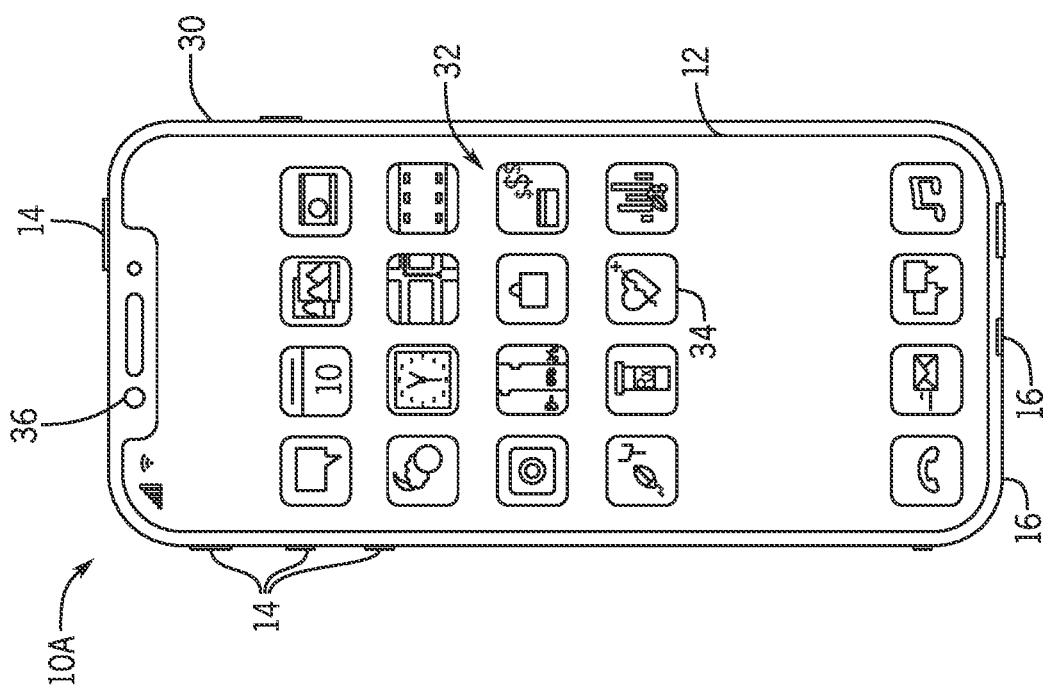
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 30 (e.g., housing) to, for example, protect interior components from physical damage and/or shield them from electromagnetic interference. The enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Input devices 14 may be accessed through openings in the enclosure 30. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
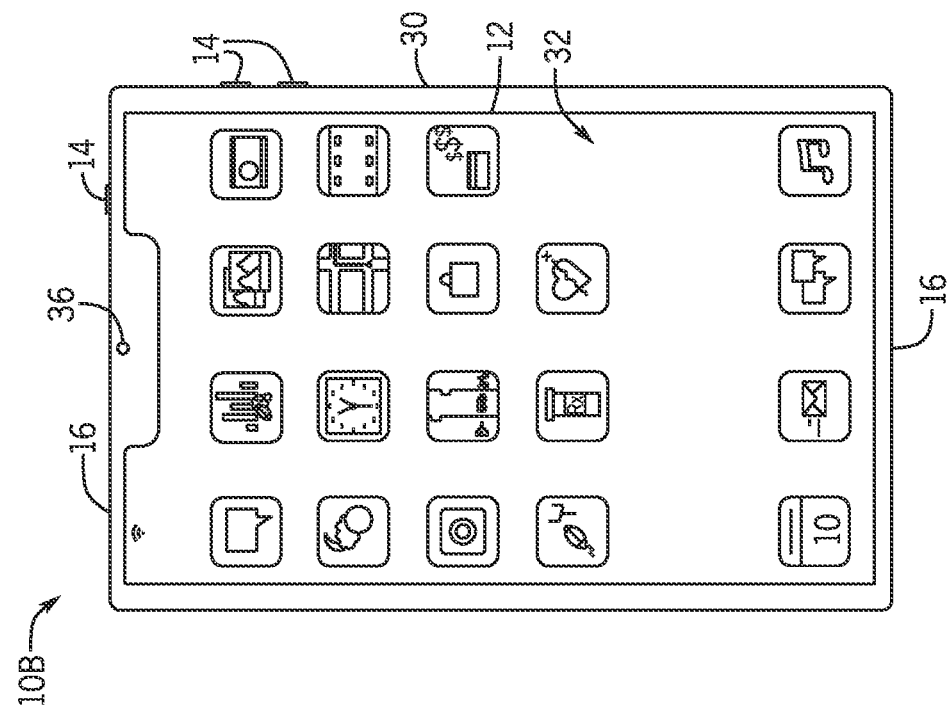
FIG. 3 is another example of the electronic device of FIG. 1 in the form of a tablet device, in accordance with an embodiment.
Figure 4:
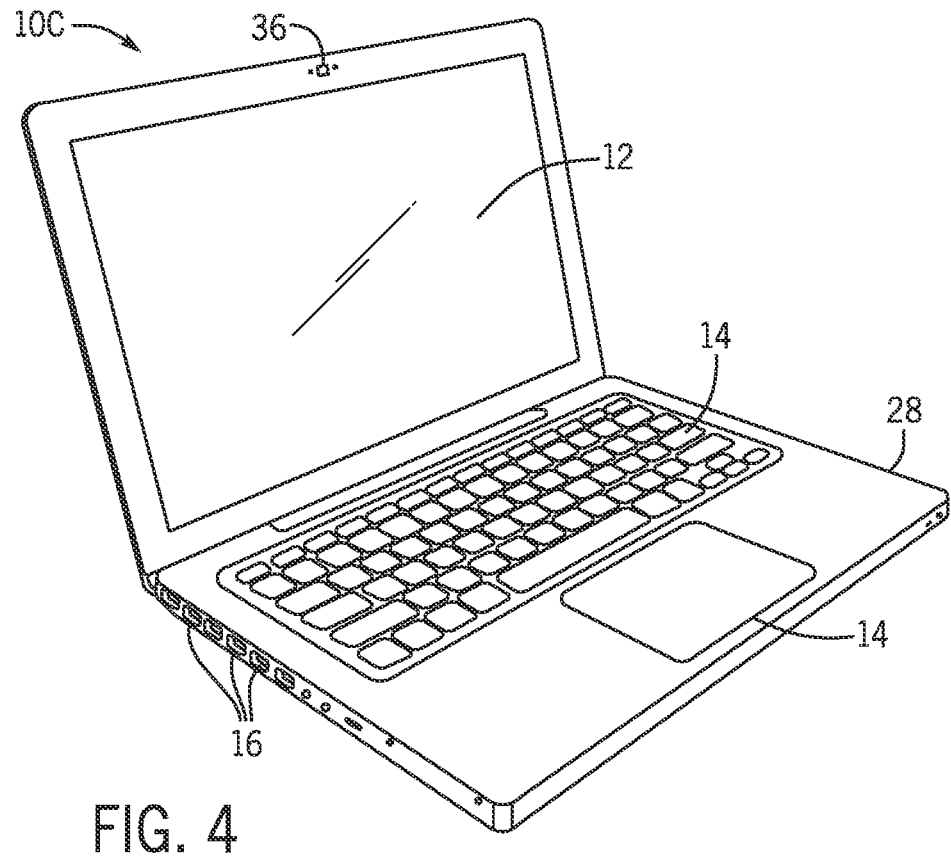
FIG. 4 is another example of the electronic device of FIG. 1 in the form of a computer, in accordance with an embodiment.
Figure 5:
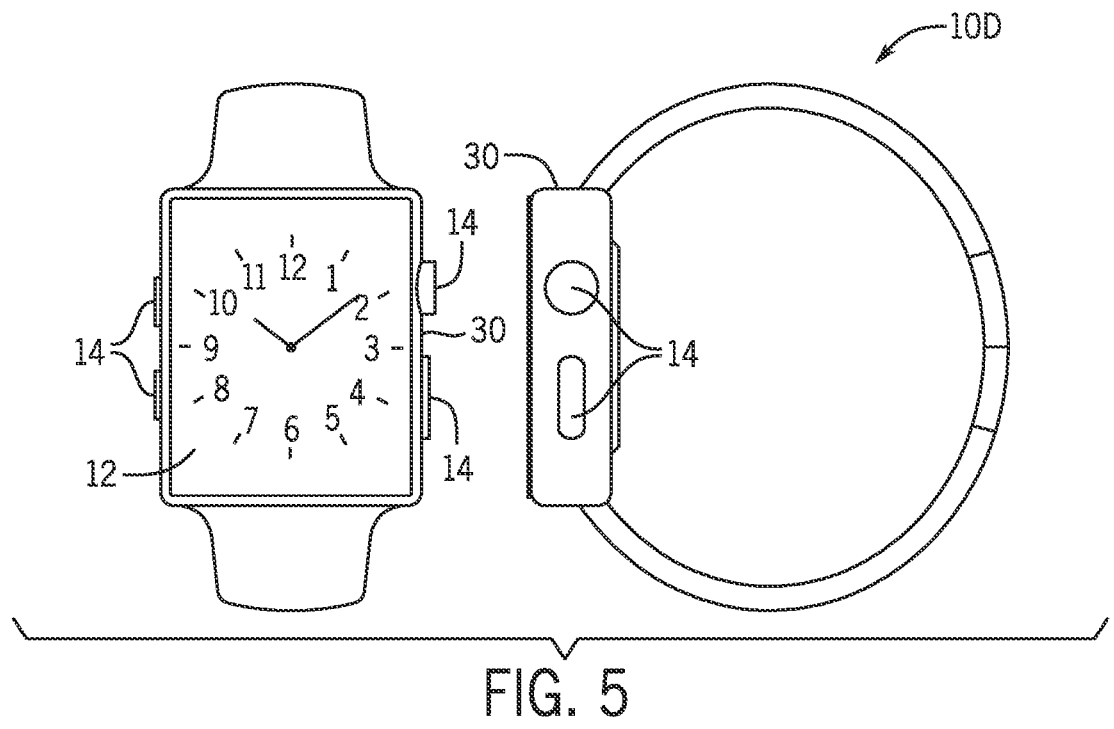
FIG. 5 is another example of the electronic device of FIG. 1 in the form of a watch, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
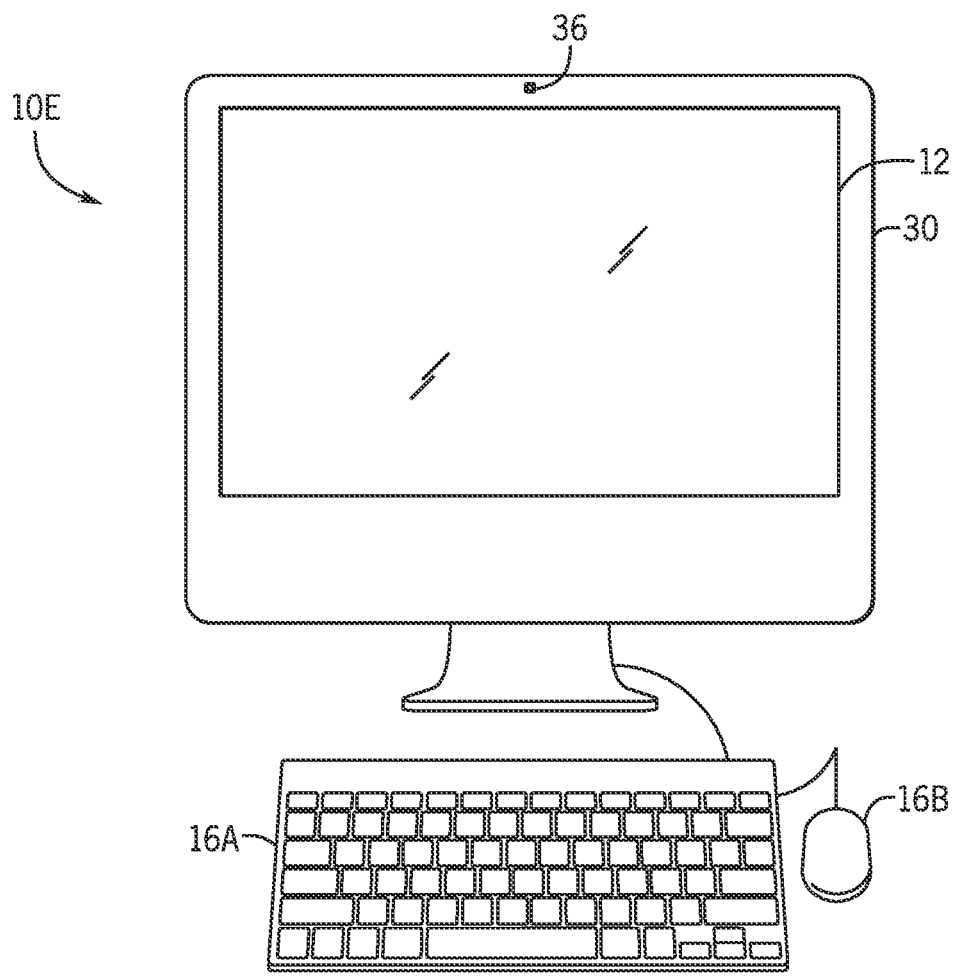
FIG. 6 is another example of the electronic device of FIG. 1 in the form of a computer, in accordance with an embodiment.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

As described above, the electronic display 12 may display images based on image data. Before being used to display a corresponding image on the electronic display 12, the image data may be processed via the image processing circuitry 28. The image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 7:
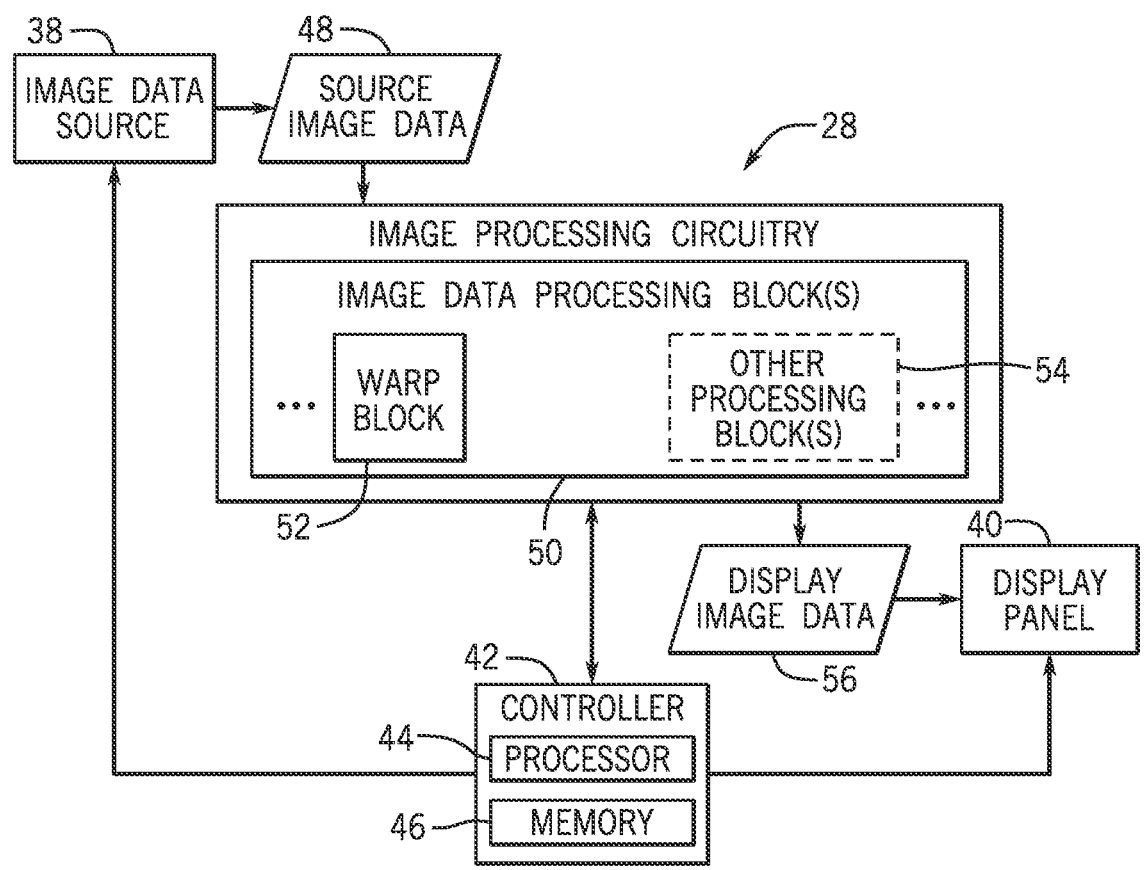
FIG. 7 is a schematic diagram of the image processing circuitry of FIG. 1 including a warp block, in accordance with an embodiment.

To help illustrate, a portion of the electronic device 10, including image processing circuitry 28, is shown in FIG. 7. The image processing circuitry 28 may be implemented in the electronic device 10, in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include hardware or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a reflective technology display, a liquid crystal display (LCD), or any other suitable type of display panel 40. In some embodiments, the controller 42 may control operation of the image processing circuitry 28, the image data source 38, and/or the display panel 40. To facilitate controlling operation, the controller 42 may include a controller processor 44 and/or controller memory 46. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an aRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue) or the sub-pixels themselves.

As described above, the image processing circuitry 28 may operate to process source image data 48 received from the image data source 38. The image data source 38 may include captured images (e.g., from one or more cameras 36), images stored in memory, graphics generated by the processor core complex 18, or a combination thereof. Additionally, the image processing circuitry 28 may include one or more sets of image data processing blocks 50 (e.g., circuitry, modules, or processing stages) such as a warp block 52. As should be appreciated, multiple other processing blocks 54 may also be incorporated into the image processing circuitry 28, such as a pixel contrast control (PCC) block, color management block, a dither block, a blend block, a burn-in compensation (BIC) block, a scaling/rotation block, etc. before and/or after the warp block 52. The image data processing blocks 50 may receive and process source image data 48 and output display image data 58 in a format (e.g., digital format, image space, and/or resolution) interpretable by the display panel 40. Further, the functions (e.g., operations) performed by the image processing circuitry 28 may be divided between various image data processing blocks 50, and, while the term "block" is used herein, there may or may not be a logical or physical separation between the image data processing blocks 50.

Figure 8:
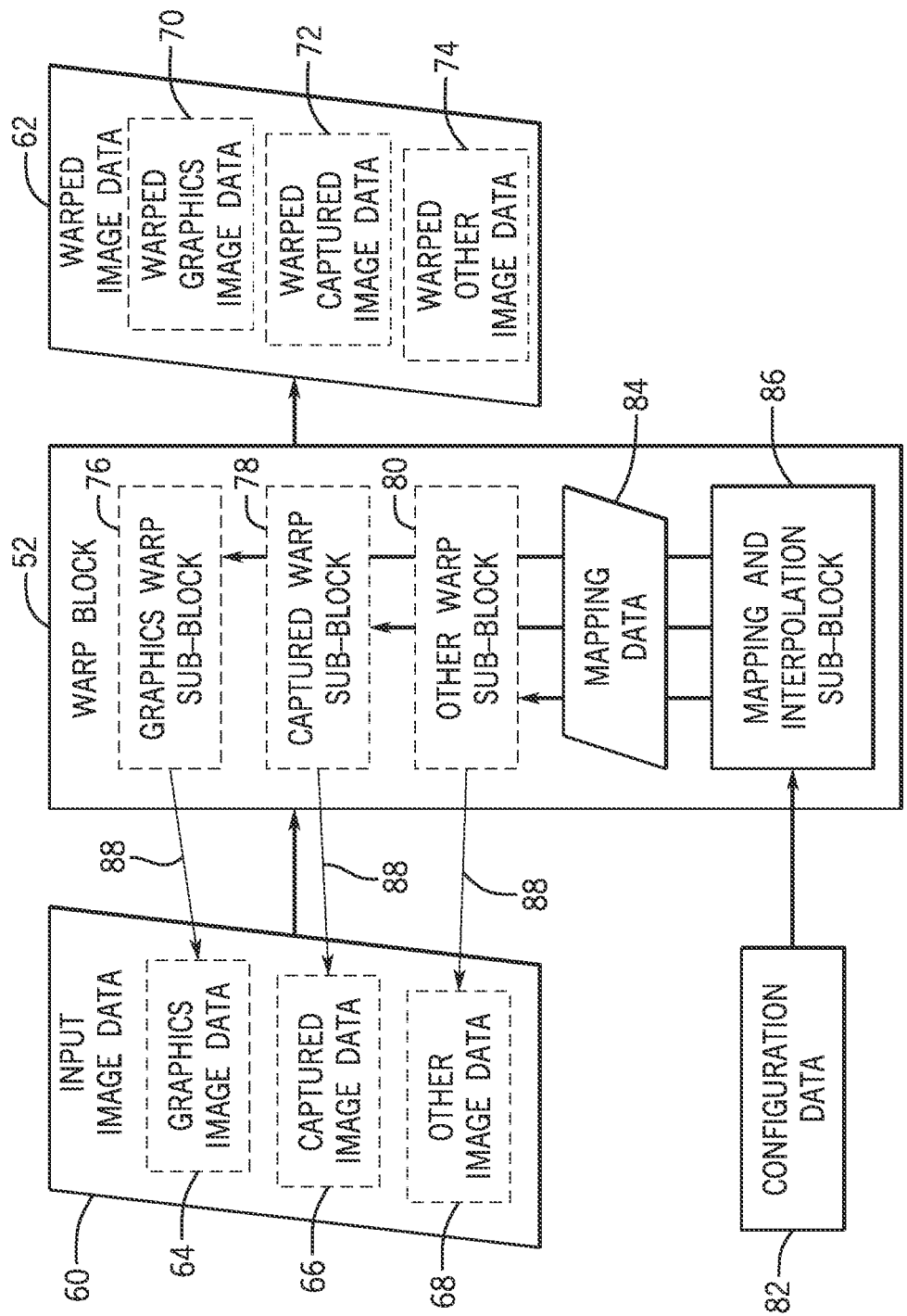
FIG. 8 is a schematic diagram of the warp block of FIG. 7, in accordance with an embodiment.

In some scenarios, an image to be displayed may, if unaltered, appear distorted when perceived by a viewer due to environmental effects, properties of the electronic display 12, the viewer's perspective (e.g., POV), image processing alterations such as shifts and scaling, and/or other distorting factors. As such, in some embodiments, the warp block 52, as shown in FIG. 8, may remap input image data 60 such that the generated warped image data 62 accounts for such distortions when displayed (e.g., on the display panel 40). As should be appreciated, the input image data 60 may include any suitable image data desired to be transformed (e.g., warped). For example, the input image data 60 may include graphics image data 64 (e.g., a stored or generated digital image), captured image data 66 (e.g., a video image taken by a camera 36), and/or other image data 68 such as matting image data generated to represent alpha values for an image blending process, image data received via the network interface 24 or the I/O ports 16), etc. As such, the warp block 52 may generate warped image data 62 (e.g., warped graphics image data 70, warped captured image data 72, warped other image data 74, etc.) to change the amount (e.g., resolution) or distribution such as (e.g., shape, relative size, perspective, etc.) of pixel values of the input image data 60 to account for different display scenarios and/or input image characteristics.

For example, the warped image data 62 may account for curved edges and/or lensing effects (e.g., of a cover glass) associated with the display panel 40 and/or for a viewer's POV relative to the display panel 40 or relative to an image capturing device (e.g., camera 36). Furthermore, the electronic display 12 may be a foveated display such that different portions of the display panel 40 are displayed at different resolutions (e.g., depending on a viewer's gaze), and the warp block 52 may consider the resolution at the different portions of the display panel 40 when determining the mapping between the input image data 60 and the warped image data 62. Additionally, the warp block 52 may also take into account distortions associated with the input image data 60 and/or the image data source 38. For example, captured image data 66 may be warped to account for lensing effects (e.g., camera lens distortion) associated with capturing the image and/or to account for a difference between the POV of a user and the POV of the camera 36. As should be appreciated, captured image data 66 is given as an example set of input image data 60 that may be warped for distortions associated with the image data source 38 and any set of input image data 60 may be warped for distortions associated with the respective image data source 38 and/or to obtain a common image space. Moreover, multiple warp operations (e.g., accounting for multiple distortion effects) may be accomplished via a single warp (e.g., a single mapping accounting for multiple distortions) or consecutively warped. As such, before being displayed, input image data 60 may be warped to change to the amount or distribution of pixel values such that the perceived image has limited or no distortion.

Furthermore, in some embodiments, the warp block 52 may warp multiple different sets of input image data 60 (e.g., graphics image data 64, captured image data 66, other image data 68, etc.) simultaneously (e.g., in parallel) or sequentially for use separately or together. For example, an image may be generated by blending multiple sets of input image data 60 from one or more image data sources 38. However, in some scenarios, image data to be blended may be warped to a common image space prior to blending, which may be accomplished by the warp block 52. Image blending may be utilized (e.g., for virtual reality, mixed reality, and/or augmented reality) to incorporate multiple sets of warped image data 62 into a single image frame. For example, a generated object (e.g., warped graphics image data 70) may be incorporated into a captured image of a real-life surrounding (e.g., warped captured image data 72) and/or a portion of the captured image may be utilized as a separate blended layer for a foreground (e.g., based on warped matting image data) such that the generated object is between the portion in the foreground and a background portion of a captured image. Additionally or alternatively, a portion of a captured image (e.g., warped captured image data 72) may be incorporated into a virtual surrounding (e.g., warped graphics image data 70). As such, the input image data 60 of one or more image data sources 38 may be blended together to form a single output image after being warped to a common image space via the warp block 52.

As discussed above, the warp block 52 of the image processing circuitry 28 may warp one or more sets of input image data 60 to account for input distortions (e.g., camera lens distortion), output distortions (e.g., lensing effects associated with the shape of the display panel and/or glass cover thereof), processing distortions (e.g., a POV change, shifts, scaling, etc.) and/or to achieve a common image space for blending. Moreover, the image processing circuitry may include separate warp hardware (e.g., for parallel processing) and/or perform separate warp operations using the same hardware for different sets of input image data. For example, in some embodiments, the warp block 52 may include a graphics warp sub-block 76, a captured warp sub-block 78, and/or an other warp sub-block 80. As should be appreciated, the sub-blocks described herein are given as examples, and any suitable warping sub-block may utilize the features discussed herein to warp any suitable set of input image data 60 and generate warped image data 62.

In some embodiments, the warp block 52 may utilize configuration data 82 associated with the desired warp effects to generate a mapping from the input image data 60 to the warped image data 62. The configuration data 82 may include mappings, algorithms, and/or parameters indicative of the warp to be accomplished for a set of input image data 60. Furthermore, the configuration data 82 may include static and/or dynamic aspects and may include different parameters/mappings for different sets of input image data 60. For example, the configuration data 82 may include a static mapping between a generated graphics image space (e.g., graphics image data 64) to a display image space (e.g., warped graphics image data 70) accounting for distortions associated with the electronic display 12 that do not change. Moreover, the configuration data 82 may include a static mapping between a camera image space (e.g., captured image data 66) to a display image space (e.g., warped captured image data 72) accounting for camera lens distortions that do not change and distortions associated with the electronic display 12 that do not change. As should be appreciated, captured image data 66 from a camera 36 is given as an example set of input image data 60, and such data may or may not be processed or partially processed prior to the warp block 52 of the image processing circuitry 28. Moreover, the camera 36 may include multiple or variable lenses that correlate to a dynamic portion of the configuration data 82. Dynamic aspects of the configuration data may provide for different mappings according to the scenario at the time of warping (e.g., for the image frame being processed). For example, in a foveated display, the output resolution at different portions of the display panel may change depending on a focal point of the user's gaze (e.g., determined by eye-tracking), which may alter the mapping. In other words, which input pixels of the input image data 60 map to which output pixel positions for the display panel 40 (e.g., as characterized by warping the warped image data 62) may change based on parameters of the configuration data 82. As should be appreciated, the configuration data 82 may include any suitable information (e.g., parameters, tags, flags, algorithms, mappings, etc.) that characterize the warp to be achieved for a particular set of input image data 60.

Based on the configuration data 82, mapping data 84 may be generated (e.g., via a mapping and interpolation sub-block 86) correlating the output pixel values of the warped image data 62 to pixel values of the input image data 60. As should be appreciated, the output image space may be associated with the physical pixel locations of the display panel 40 (e.g., the display image space) or any desired image space. Moreover, the warp block 52 (e.g., the graphics warp sub-block 76, the captured warp sub-block 78, the other warp sub-block 80, etc.) may perform fetches 88 of the input image data 60 from the relevant image data source 38 (e.g., memory 20, a graphics generator of the processor core complex 18, other processing blocks 54, a network interface 24, a camera 36, etc.). Utilizing the mapping data 84, the warp block 52 may generate warped image data 62 based on the input image data 60.

Figure 9:
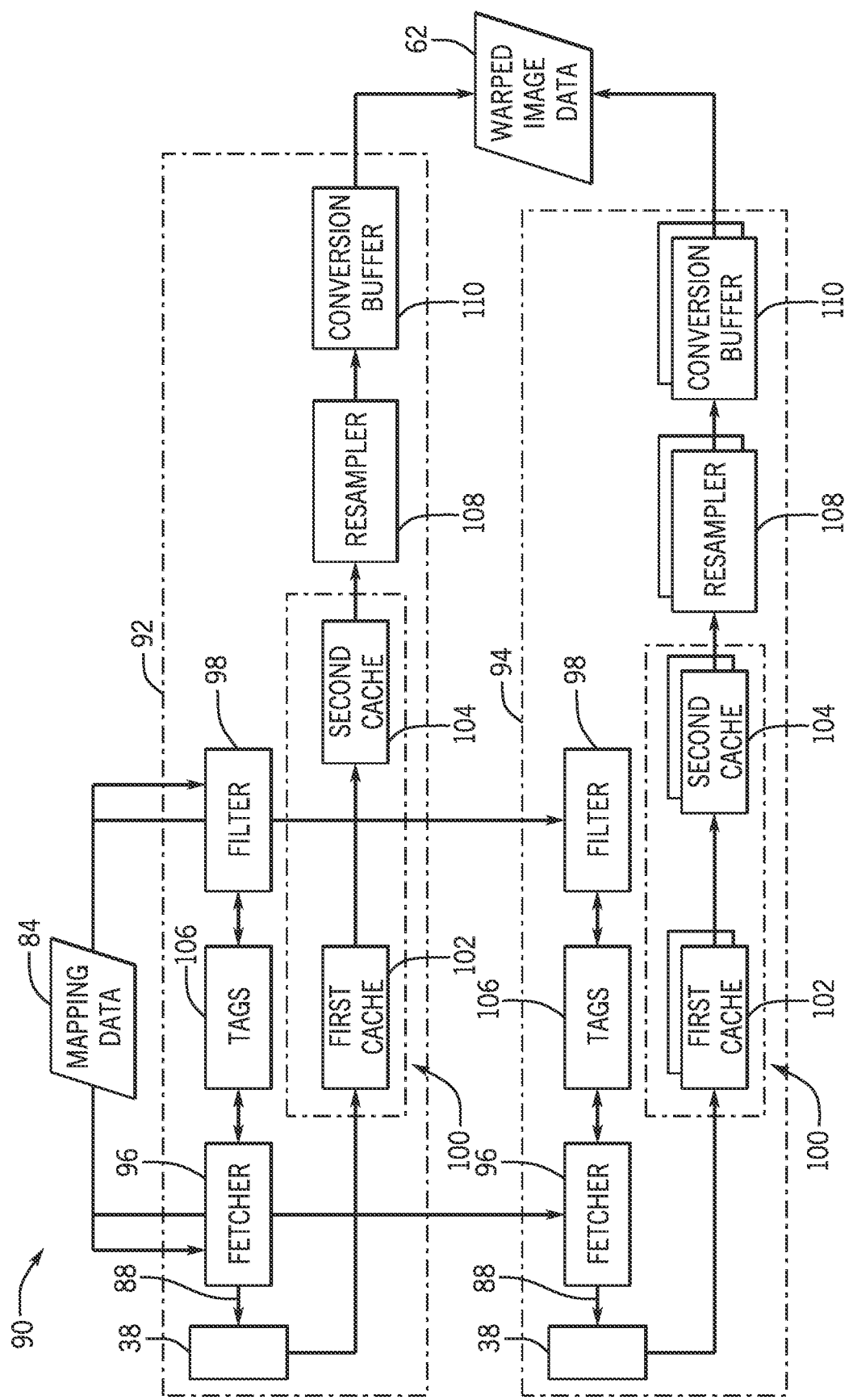
FIG. 9 is a schematic diagram of a warp sub-block of the warp block of FIG. 8, in accordance with an embodiment.

FIG. 9 is a schematic of a warp sub-block 90 of the warp block 52. As should be appreciated, the warp sub-block 90 may be indicative of the graphics warp sub-block 76, the captured warp sub-block 78, and/or the other warp sub-block 80, for warping any set of input image data 60. Moreover, in some embodiments, the warp block 52 (or a warp sub-block 90 thereof) may include one or more separate sections 92 and/or combined sections 94 for different components of a set of input image data 60. The different sections 92, 94 may perform warp operations in different manners according to the warp to be achieved (e.g., based on the mapping data 84). For example, in some embodiments, different components of the input image data 60 may have different resolutions (e.g., bit-depth) and, therefore, have different mappings between the input image data 60 and the warped image data 62. In other words, components of a set of input image data 60 undergoing similar warp operations (e.g., where the fetched portions of the components are the same) may be warped in a combined section 94, and each component may be processed through separate but parallel data paths. Moreover, a component of the set of input image data 60 undergoing an individual warp operation may be warped in a separate section 92. As a non-limiting example, in some embodiments, a gamma (e.g., Y) component and/or alpha component (e.g., α) of the input image data 60 may be warped in a separate section 92 while chromatic components (e.g., Cb and Cr) and/or base color components (e.g., red, green, and blue (RGB)) are warped in a combined section 94. Together, the sections 92, 94 may generate the warped image data 62 corresponding to the set of input image data 60. Additionally or alternatively, a warp sub-block 90 may utilize multiple separate sections 92 operating in parallel regardless of the similar or different processing of components or utilize the same separate section 92 recursively for different components of input image data 60. As should be appreciated, the sections 92, 94 utilized for warping the different components of the input image data 60 may vary based on implementation. For example, the captured warp sub-block 78 may include a different arrangement of sections 92, 94 than the graphics warp sub-block 76 and/or another warp sub-block 80. Furthermore, the warp block 52 may include multiple warp sub-blocks 90 for warping different sets of input image data 60 (e.g., in parallel) or a single warp sub-block 90. As discussed herein, the warped image data 62 from the one or more warp sub-blocks 90 may be displayed or used in further image processing such as blending.

The warp sub-block 90 may receive the mapping data 84 and utilize a fetcher 96 and/or a filter 98 to request (e.g., fetch 88) portions of the input image data 60 to populate a two-stage cache architecture 100. For example, the two-stage cache architecture 100 may include a first cache 102 populated with input image data 60 by the fetcher 96 and a second cache 104 populated with portions of the input image data 60 from the first cache 102. The first cache 102 and the second cache 104 may be hierarchically distinct or of the same cache level. For example, the first cache 102 may be a level 1 (L1) cache and the second cache 104 may be a level 0 (L0) cache. As should be appreciated, any level cache may be used for the first cache 102 and the second cache 104, depending on implementation. Moreover, the fetcher 96 may utilize the mapping data 84 (e.g., based on the configuration data 82) to fetch 88 the input image data 60 in an order associated with the mapping between the input image data 60 and the warped image data 62. In other words, the fetcher 96 may request input image data 60 to the first cache 102 in an intended order of use instead of fetching the input image data 60 in raster scan order, as discussed further below. Moreover, the filter 98 may utilize one or more tags 106 indicative of the fetched image data to be utilized in the warp to populate the second cache 104 from the first cache 102. Additionally, a resampler 108 may interpolate the output pixel values from a set of fetched image data in the second cache 104, and, if utilized, a conversion buffer 110 may place the output pixel values in an output format indicative of the warped image data 62.

Figure 10:
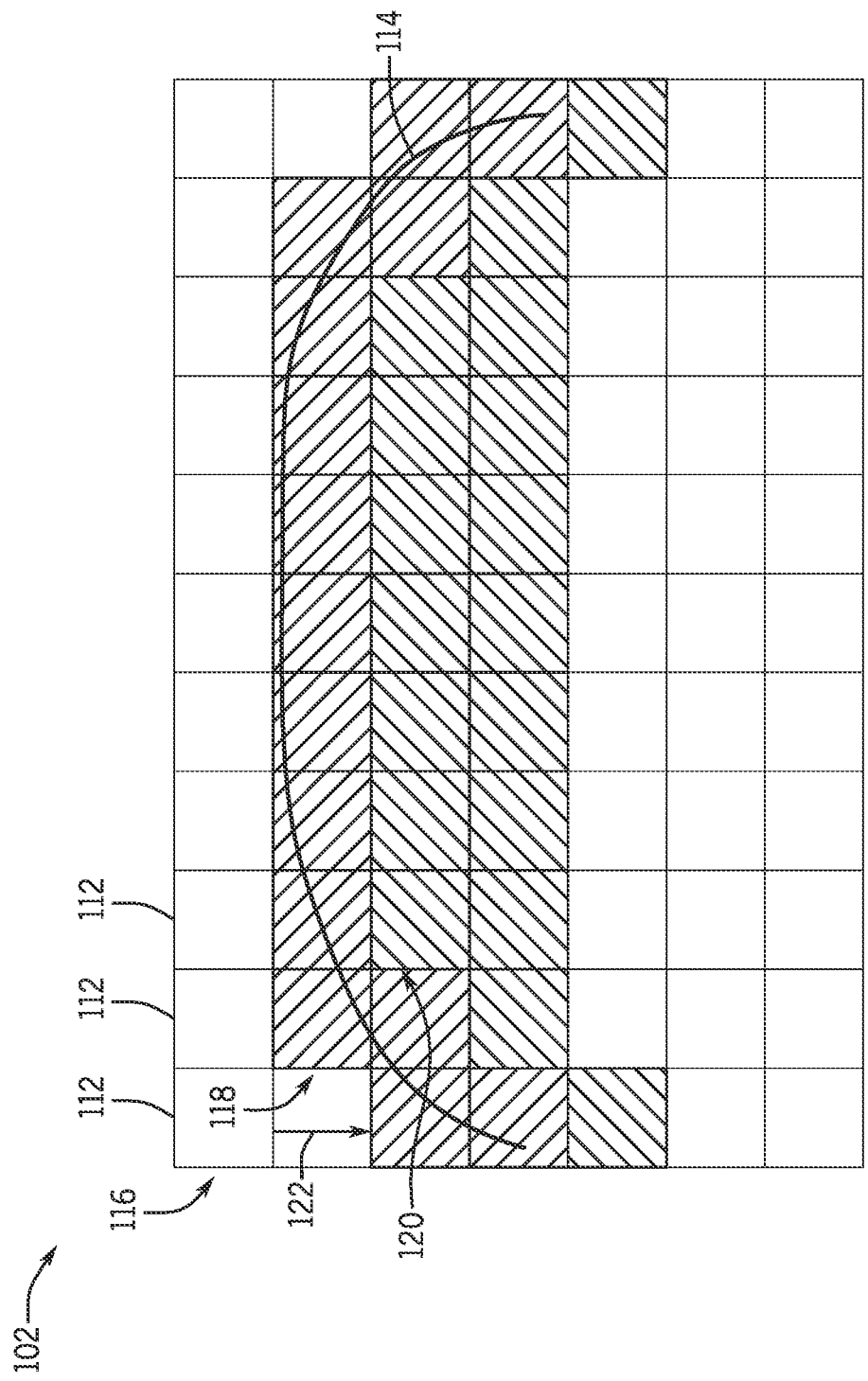
FIG. 10 is a conceptual diagram of how a first cache fetches input image data, in accordance with an embodiment.

In some embodiments, the input image data 60 may be fetched 88 in tiled sections (e.g., tiles 112) as shown in the example first cache 102 of FIG. 10. Tiles 112 are rectangular (square or not) groupings of pixel values of the input image data 60 and may be of any suitable size (e.g., 2×2, 4×4, 16×16, 32×32, and so on) depending on implementation. To increase efficiency, the input image data 60 may be fetched 88 according to a virtual curve 114 indicative of an output row of the warped image data 62 mapped to the source image space (e.g., based on the mapping data 84). For example, the virtual curve 114 of FIG. 10 may be indicative of a first (e.g., top) row of the warped image data 62. As the virtual curve 114 does not intersect with the first section 116 of tiles 112, pixel values of tiles 112 in the first section 116 may not be utilized in the warp and, therefore, may be skipped during the fetch 88. As should be appreciated, in some embodiments, a buffer around the virtual curve 114 may be considered to include pixel values that may be utilized in interpolating the output pixel values, and tiles 112 that are intersect the virtual curve 114 and/or the buffer may be fetched 88. Moreover, the sections 116, 118, 120 discussed herein are given for illustrative purposes and may or may not indicate logical distinction by the warp block 52. Depending on the warp to be achieved (e.g., according to the mapping data 84), the virtual curve 114 may span multiple tiles 112 vertically as well as horizontally. In the example of FIG. 10, the virtual curve 114 spans the tiles 112 of the second section 118 and is three vertical tiles in height. As such, the fetch 88 may include the tiles 112 of the second section 118. In some scenarios, it may be beneficial (e.g., for memory access and/or fetching 88) to maintain a constant height (e.g., number of vertical tiles 112) when fetching 88 the input image data 60. As such, in some embodiments, a third section 120 of tiles 112 may be fetched 88 with the second section 118, and may act as part of a pre-fetch for subsequent warp operations (e.g., for subsequent output rows). Moreover, as additional output rows of the warped image data 62 are generated, input image data 60 may continue to be fetched 88. As should be appreciated, the fetched 88 tiles 112 may include offsets 122, which may increase fetching 88 and/or cache-size efficiency, or be banded as a rectangular section of tiles 112 that includes the virtual curve 114, depending on implementation.

Figure 11:
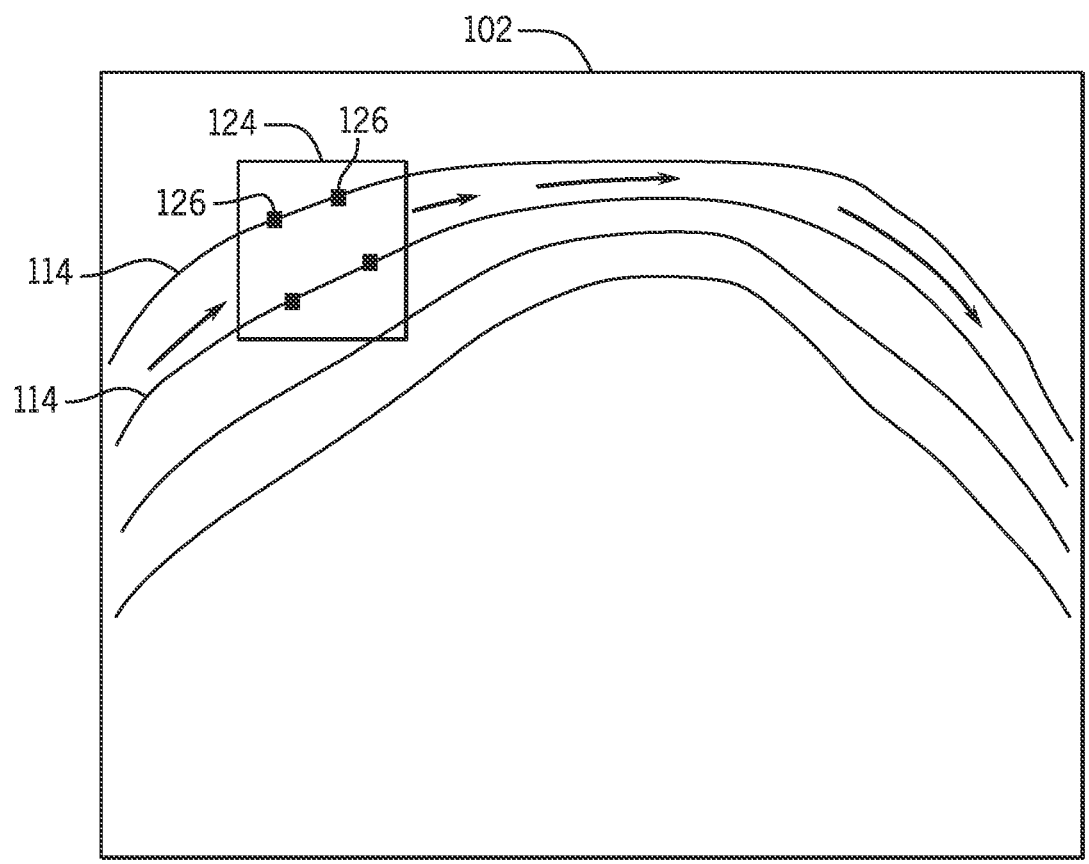
FIG. 11 is a conceptual diagram of a sliding window that traverses the first cache to populate a second cache, in accordance with an embodiment.

The fetcher 96 and/or filter 98 may use tags 106 to correlate portions of the first cache 102 to the pixel coordinates of the input image data 60 (e.g., along the virtual curve 114). Moreover, the tags 106 may be utilized (e.g., by the filter 98) to define a sliding window 124 that includes mapped input pixels 126 of the input image data 60 that are mapped to output pixels of the warped image data 62, as in FIG. 11. Pixel values within the sliding window 124 may be used to populate the second cache 104 (e.g., based on the tags 106), and the populated second cache 104 may be utilized to generate one or more output pixels values of the warped image data 62. By utilizing the two-stage cache architecture 100, more efficient fetching 88 may be accomplished while output pixel values are determined in parallel to ensure timing constraints (e.g., output timing of the warped image data 62) are upheld. Additionally, the two-stage cache architecture may increase efficiency by retaining fetched input image data 60 in the first cache 102, while the second cache 104 is populated based on a sliding window 124 that traverses the first cache 102. Thus, the input image data 60 may be fetched 88 from the image data source 38 (e.g., memory 20, etc.) a single time, reducing or eliminating duplicate fetches 88 of the same pixel values. Moreover, in some embodiments, the tags 106 may be utilized in both fetching 88 and populating the second cache 104 with pixel values of the sliding window 124, further increasing efficiency and reducing duplicate processing.

Figure 12:
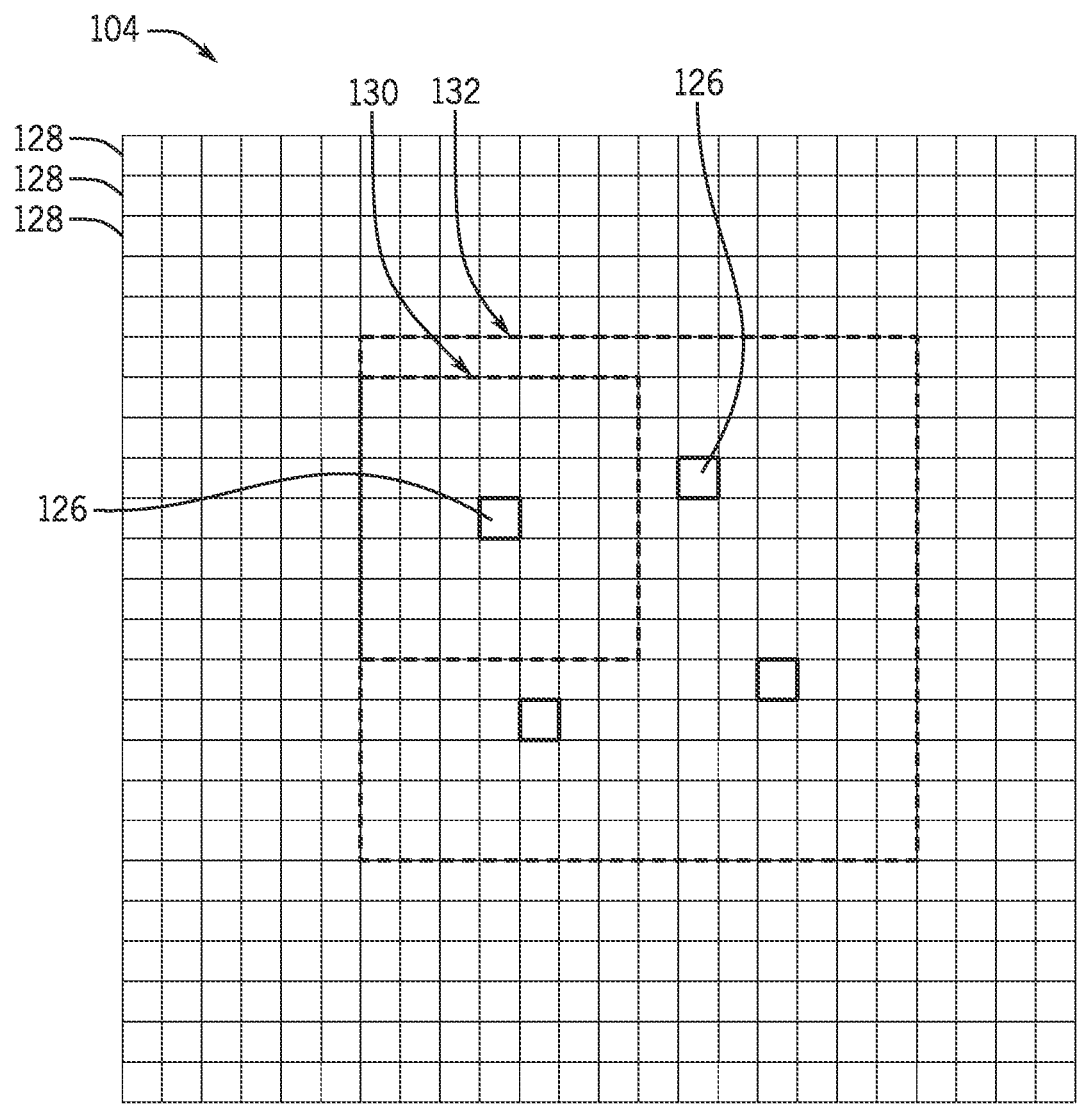
FIG. 12 is a conceptual diagram of a second cache populated with input image data from the first cache of FIGS. 10 and 11, in accordance with an embodiment.

The sliding window 124 may traverse the first cache 102 (e.g., along the virtual curve 114) and populate the second cache 104 with pixel values that include the mapped input pixels 126. In some embodiments, the second cache 104 may include multiple mapped input pixels 126 such that multiple output pixel values of the warped image data 62 are generated simultaneously (e.g., considered or calculated concurrently), which may also increase efficiency and/or reduce processing time. Furthermore, the multiple mapped input pixels 126 may be associated with a single or multiple virtual curves 114 to generate output pixel values for one or more output rows of the warped image data 62. For example, FIG. 12 is an example second cache 104 populated by pixel values 128 of the input image data 60 pulled from the first cache 102 that include the mapped input pixels 126 of two output rows (e.g., virtual curves 114). Additionally, each mapped input pixel 126 may be associated with a set of support pixels 130. The support pixels 130 may be used for interpolations and/or other image processing techniques (e.g., dithers) when generating a corresponding output pixel value of the warped image data 62. For example, as should be appreciated, the output pixels may or may not directly map to a mapped input pixel 126, but rather a pixel location that may or may not have an integer value (e.g., aligning with a pixel grid of the input image data 60). As such, the output pixel value may be interpolated based on the mapped input pixel 126 and support pixels 130. Furthermore, by considering multiple mapped input pixels 126 together, the support pixels 130 may overlap, increasing the efficiency by reducing while four mapped input pixels 126, corresponding to a 2×2 set of output pixels of the warped image data 62, are shown in the second cache 104 of FIG. 12, as should be appreciated, any number (e.g., 1, 2, 4, 6, 9, 16, etc.) of mapped input pixels 126 may be retained in the second cache 104 and processed together depending on implementation. Furthermore, any number of support pixels 130 may be attributed to a mapped input pixel 126, depending on implementation.

Depending on the expected warps to be achieved and/or programmed bounds of the warp process, the second cache 104 may be sized such that a bounding box 132, which includes the mapped input pixels 126 and the support pixels 130, fits within the second cache 104. In other words, the bounding box 132 may be less than or equal to the size of the second cache 104. The bounding box 132 may define the set of pixels that are utilized to generate the output pixels. For example, pixels within the bounding box may be used by the resampler 108 to generate the warped image data 62. Moreover, the maximum size of the bounding box 132 may be set based on the input requirements of the resampler 108, and both may vary based on implementation. Using the pixel values 128 within the bounding box 132 of the second cache 104, the resampler 108 may interpolate the output pixel values of the warped image data 62.

Figure 13:
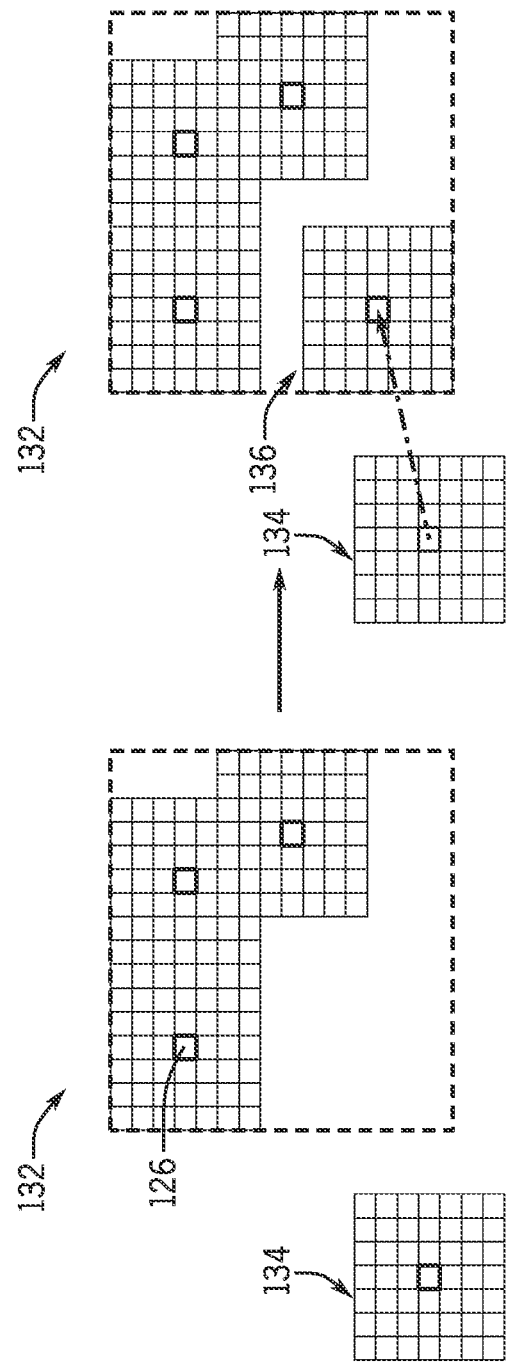
FIG. 13 is a schematic diagram of a clipping correction associated with the second cache, in accordance with an embodiment.

As discussed above, the bounding box 132 may contain the mapped input pixels 126 and their support pixels 130. Moreover, the expected warps (e.g., range of mapping data 84) may be predetermined (e.g., based on estimated or known extremes of the virtual curve 114), and the size of the bounding box 132 and/or second cache 104 may be based thereon. However, in some scenarios, a particular warp operation may be desired that references outlier pixels 134, mapped input pixels 126 and/or support pixels 130 not within the bounding box 132, as shown in FIG. 13. Such outlier pixels 134 may or may not be included in the second cache 104. However, to maintain synchronicity and timing, the outlier pixels 134 may be clipped, and a set of replacement pixels 136 may be utilized in place of the outlier pixels 134. In some embodiments, the set of replacement pixels 136 may be the closest set of pixels to the outlier pixels 134 that is enclosed in the bounding box 132. As such, processing integrity (e.g., continued operation) and efficiency may be maintained for any suitable warp profile (e.g., virtual curve 114 based on mapping data 84).

Figure 14:
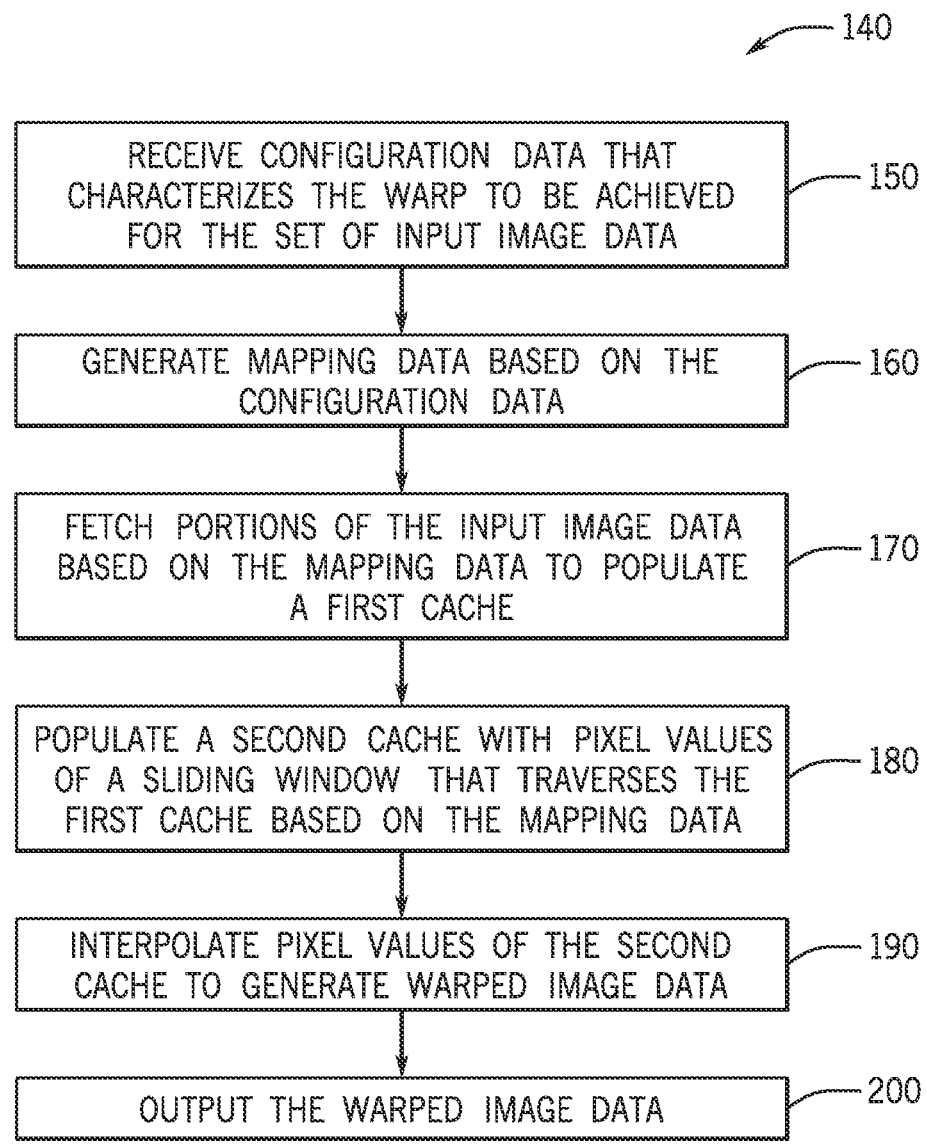
FIG. 14 is a flowchart of an example process for warping input image data to generate warped image data, in accordance with an embodiment.

FIG. 14 is a flowchart 140 of an example process for warping the input image data 60 and generating warped image data 62. Image processing circuitry 28, such as the warp block 52, may receive configuration data 82 that characterizes the warp to be achieved for a set of input image data 60 (process block 150). As should be appreciated, receiving the configuration data 82 may include but is not limited to using static parameters, algorithms, etc. from memory 20 and/or determining dynamic aspects such as considering eye tracking data and/or relative positions for a POV correction. Additionally, mapping data 84 (e.g., indicative of the virtual curve 114) may be generated based on the configuration data 82 (process block 160). Portions (e.g., tiles 112) of the input image data 60 may be fetched from an image data source 38 based on the mapping data to populate first cache 102 of the two-stage cache architecture 100 (process block 170). Additionally, the second cache 104 of the two-stage cache architecture 100 may be populated with pixel values 128 of a sliding window 124 that traverses the first cache 102 based on the mapping data 84 (process block 180). For example, the sliding window 124 may follow the virtual curve 114 and include mapped input pixels 126 corresponding to output pixel values of the warped image data 62. The pixel values 128 of the second cache (e.g., the mapped input pixels 126 and respective support pixels 130) may be interpolated (e.g., via a resampler 108) to generate warped image data 62 (process block 190), and the warped image data 62 may be output (process block 200) for further processing (e.g., blending, compensations, etc.) and/or viewing on the electronic display 12.

In conjunction with the warp block 52, the two-stage cache architecture 100 may provide synchronicity and/or higher efficiency with respect to timing constraints to allow for a higher bandwidth (e.g., more input image data) of the warp block 52. Such efficiencies may allow for real-time operations such as warping a live camera feed for blending and/or viewing. Moreover, by saving processing time, other image processing techniques (e.g., blending, compensations, etc.) may have adequate time to be performed while maintaining real-time operations. Furthermore, although the flowchart 140 is shown in a given order, in certain embodiments, process/decision blocks may be reordered, altered, deleted, and/or occur simultaneously. Additionally, the flowchart 140 is given as an illustrative tool and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A device comprising:
   an electronic display configured to display an image based on warped image data; and
   image processing circuitry configured to generate the warped image data by warping input image data to account for one or more distortions associated with displaying the image, wherein the image processing circuitry comprises a two-stage cache architecture comprising a first cache and a second cache, wherein warping the input image data comprises:
  generating mapping data indicative of a warp between an input image space of the input image data and an output image space of the warped image data;
  fetching the input image data to populate the first cache;
  populating the second cache with a grouping of pixel values of the input image data from the first cache, wherein the grouping of pixel values is selected according to a sliding window that traverses the first cache based on the mapping data; and
  interpolating, using the second cache, between input pixel values of the grouping of pixel values to generate one or more output pixel values of the warped image data.

2. The device of claim 1, wherein the mapping data correlates to a virtual curve indicative of a row of output pixel locations of the output image space in the input image space, wherein the sliding window traverses the first cache along the virtual curve and the one or more output pixel values correspond to one or more respective pixel locations of the row of output pixel locations.

3. The device of claim 1, wherein fetching the input image data to populate the first cache comprises fetching the input image data in an order from an image data source, wherein the order is based the mapping data.

4. The device of claim 1, wherein the input image data comprises graphics image data and captured image data, wherein the image processing circuitry comprises a graphics warp sub-block configured to warp the graphics image data and a captured warp sub-block configured to warp the captured image data configured to operate in parallel, and wherein the image processing circuitry comprises blend circuitry configured to combine the warped graphics image data and the warped captured image data for a single image frame.

5. The device of claim 1, wherein the one or more distortions comprise a lensing effect associated with a glass of the electronic display.

6. The device of claim 1, wherein the image processing circuitry comprises a hardware pipeline having dedicated warp circuitry configured to generate the warped image data.

7. The device of claim 1, wherein the mapping data is based on a viewer's point-of-view relative to the electronic display, wherein the electronic display comprises a foveated display, and wherein the viewer's point-of-view corresponds to a viewer's focal point on the foveated display.

8. Image processing circuitry comprising:
  a two-stage cache architecture comprising a first cache and a second cache;
  a fetcher configured to fetch input image data and populate the first cache;
  a filter configured to select a portion of the input image data from the first cache to populate the second cache based on mapping data, wherein the mapping data is indicative of a warp between an input image space of the input image data and an output image space of warped image data; and
  a resampler configured to interpolate between pixel values of the input image data in the second cache to generate one or more pixel values of the warped image data, wherein the fetcher is configured to populate the first cache with the input image data and the resampler is configured to generate the warped image data from the portion of the input image data in the second cache in parallel.

9. The image processing circuitry of claim 8, wherein the filter is configured to select the portion of the input image data from the first cache according to a sliding window traversing the first cache based on the mapping data.

10. The image processing circuitry of claim 8, wherein the fetcher is configured to populate the first cache in an order based on the mapping data.

11. The image processing circuitry of claim 10, wherein the fetcher is configured to populate the first cache in the order based one or more tags associated with pixel locations along a virtual curve indicative of a row of output pixel locations of the output image space in the input image space, wherein the virtual curve is based on the mapping data.

12. The image processing circuitry of claim 11, wherein the filter is configured to select the portion of the input image data from the first cache based on the one or more tags.

13. The image processing circuitry of claim 8, wherein the fetcher is configured to fetch the input image data from an image data source such that individual portions of the input image data are only fetched once from the image data source.

14. The image processing circuitry of claim 8, comprising a mapping and interpolation sub-block configured to generate the mapping data based on a plurality of parameters characterizing physical distortion effects of a camera, an electronic display, or both.

15. The image processing circuitry of claim 8, wherein the first cache and the second cache are different levels of cache memory.

16. The image processing circuitry of claim 15, wherein the first cache comprises a level one (L1) cache memory and the second cache comprises a level zero (L0) cache memory.

17. A non-transitory machine readable medium comprising instructions, wherein, when executed by one or more processors, the instructions cause the one or more processors to control operations of image processing circuitry, the operations comprising:
  generating mapping data indicative of a warp between an input image space of input image data and an output image space of warped image data;
  fetching the input image data to populate a first cache of a two-stage cache architecture;
  populating a second cache the two-stage cache architecture with a grouping of pixel values of the input image data from the first cache, wherein the grouping of pixel values is selected according to a sliding window that traverses the first cache based on the mapping data; and
  interpolating, using the second cache, between input pixel values of the grouping of pixel values to generate one or more output pixel values of the warped image data.

18. The non-transitory machine readable medium of claim 17, wherein the mapping data correlates to a virtual curve indicative of a row of output pixel locations of the output image space in the input image space.

19. The non-transitory machine readable medium of claim 18, wherein the row of output pixel locations corresponds to one or more mapped input pixel locations of the input image data, wherein the operations comprise, in response to determining that a mapped input pixel location of the one or more mapped input pixel locations is outside of a bounding box, replacing a first pixel value associated with the mapped input pixel location with a second pixel value within the bounding box during interpolation of the input pixel values, wherein the bounding box comprises a contiguous set of pixel values within the second cache.

20. The non-transitory machine readable medium of claim 18, wherein fetching the input image data to populate the first cache comprises fetching the input image data in an order from an image data source, wherein the order is based the virtual curve.

\* \* \* \* \*